(12) United States Patent
Sakuma et al.

(10) Patent No.: US 10,181,737 B2
(45) Date of Patent: *Jan. 15, 2019

(54) SUPPLY AND DEMAND ADJUSTMENT SYSTEM, SUPPLY AND DEMAND ADJUSTMENT METHOD, AND SUPPLY AND DEMAND ADJUSTMENT PROGRAM

(71) Applicant: NEC Corporation, Tokyo (JP)

(72) Inventors: Hisato Sakuma, Tokyo (JP); Koji Kudo, Tokyo (JP); Hitoshi Yano, Tokyo (JP); Kazuhiko Aoki, Tokyo (JP); Yoshiho Yanagita, Tokyo (JP); Yuma Iwasaki, Tokyo (JP); Ryo Hashimoto, Tokyo (JP); Eisuke Saneyoshi, Tokyo (JP); Takahiro Toizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,248

(22) Filed: Aug. 8, 2017

(65) Prior Publication Data

US 2017/0338679 A1 Nov. 23, 2017

Related U.S. Application Data

(63) Continuation of application No. 14/771,416, filed as application No. PCT/JP2014/001092 on Feb. 28, 2014, now Pat. No. 9,859,735.

(30) Foreign Application Priority Data

Mar. 1, 2013 (JP) ................................ 2013-040698

(51) Int. Cl.
*H02J 7/00* (2006.01)
*H02J 3/32* (2006.01)
(Continued)

(52) U.S. Cl.
CPC ............ *H02J 7/0063* (2013.01); *G06Q 50/06* (2013.01); *H02J 3/14* (2013.01); *H02J 3/32* (2013.01);
(Continued)

(58) Field of Classification Search
CPC .. H02J 7/0063; H02J 7/007; H02J 3/14; H02J 3/32; H02J 3/24; H02J 2007/0067; G06Q 50/06
(Continued)

(56) References Cited

U.S. PATENT DOCUMENTS

2010/0072817 A1 3/2010 Hirst
2011/0118891 A1 5/2011 Hirst
(Continued)

FOREIGN PATENT DOCUMENTS

EP 2515406 A1 10/2012
JP 2001-086649 A 3/2001
(Continued)

OTHER PUBLICATIONS

Extended European Search Report issued by the European Patent Office for Application No. 14756366.2 dated Sep. 19, 2016 (8 pages).
(Continued)

*Primary Examiner* — Sun Lin
(74) *Attorney, Agent, or Firm* — Wilmer Cutler Pickering Hale and Dorr LLP

(57) ABSTRACT

A supply-and-demand adjustment system, that utilizes characteristics of supply-and-demand adjustment apparatuses and precisely matches a total supply-and-demand adjustment amount with a required adjustment amount when performing a supply-and-demand adjustment. The supply-and-demand adjustment system comprises a central control apparatus and one or more supply-and-demand adjustment
(Continued)

apparatuses, the central control apparatus includes a state collection unit that collects information with regard to a state of each supply-and-demand adjustment apparatus, an allocation band calculation unit that calculates a frequency band and an intensity of a fluctuation of a supply-and-demand adjustment to be allocated to each supply-and-demand adjustment apparatus based on the information of the state, and an adjustment amount calculation unit that calculates a supply-and-demand adjustment amount for each supply-and-demand adjustment apparatus based on the frequency band and the intensity of the fluctuation of the supply-and-demand adjustment to be allocated to said each supply-and-demand adjustment apparatus.

20 Claims, 11 Drawing Sheets

(51) Int. Cl.
*G06Q 50/06* (2012.01)
*H02J 3/14* (2006.01)
*H02J 3/24* (2006.01)

(52) U.S. Cl.
CPC ............... *H02J 7/007* (2013.01); *H02J 3/24* (2013.01); *H02J 2007/0067* (2013.01); *Y02B 70/3225* (2013.01); *Y04S 10/54* (2013.01); *Y04S 20/222* (2013.01)

(58) Field of Classification Search
USPC .......................................... 320/136
See application file for complete search history.

(56) References Cited

U.S. PATENT DOCUMENTS

| | | |
|---|---|---|
| 2011/0190958 A1 | 8/2011 | Hirst |
| 2012/0271470 A1 | 10/2012 | Flynn et al. |

FOREIGN PATENT DOCUMENTS

| | | |
|---|---|---|
| JP | 2002-209336 A | 7/2002 |
| JP | 2006-333563 A | 12/2006 |
| JP | 2007-143225 A | 6/2007 |
| JP | 2007-151371 A | 6/2007 |
| JP | 2008-067544 A | 3/2008 |
| JP | 2011-114900 A | 6/2011 |
| WO | WO-2006/128709 A2 | 12/2006 |

OTHER PUBLICATIONS

International Search Report corresponding to PCT/JP2014/001092 dated Apr. 8, 2014 (2 pages).

SUPPLY AND DEMAND ADJUSTMENT SYSTEM, SUPPLY AND DEMAND ADJUSTMENT METHOD, AND SUPPLY AND DEMAND ADJUSTMENT PROGRAM

CROSS-REFERENCE TO RELATED APPLICATIONS

This application is a Continuation of U.S. application Ser. No. 14/771,416 filed on Aug. 28, 2015 entitled "Supply and Demand Adjustment System, Supply and Demand Adjustment Method, and Supply and Demand Adjustment Program" which is a national stage application of International Application No. PCT/JP2014/001092 entitled "Supply and Demand Adjustment System, Supply and Demand Adjustment Method, and Supply and Demand Adjustment Program" filed on Feb. 28, 2014, which claims priority to Japanese Application No. 2013-040698 filed on Mar. 1, 2013. The disclosures of each of the aforementioned applications are incorporated herein by reference for all purposes.

TECHNICAL FIELD

The present invention relates to a supply and demand adjustment system and a supply and demand adjustment method, in which a central control apparatus adjusts supply and demand for one or more supply-and-demand adjustment apparatuses.

BACKGROUND ART

With prevalence of renewable (reproducible) power supplies of which outputs are difficult to predict, it is demanded to improve precision of supply and demand adjustment capability. The supply and demand adjustment capability is a capability to change electricity demand or electricity supply in response to an instruction so as to cancel imbalance between supply and demand. Specifically, the supply and demand adjustment capability may be a capability to change an amount of charge and discharge at a power storage apparatus, or to change a load variation of a controllable load.

For example, in order to prevent a fluctuation in outputs of renewable power supplies from adversely affecting an upper system, a method of stabilizing fluctuations in power flows at a connection point (such as a substation or a microgrid, that is under control of power distributing operators), through which a certain area is linked to the upper system, is known. Specifically, in the method, an amount of supply and demand adjustment is changed by using supply-and-demand adjustment apparatuses installed in the area so as to cancel the output fluctuation.

Herein, the supply-and-demand adjustment apparatus is an apparatus that may change electricity demand and electricity supply. The supply-and-demand adjustment apparatus includes, for example, a power storage apparatus such as a lithium-ion battery, a lead storage battery, and a NAS battery (registered trademark), a controllable load, a small-sized power generator, and the like.

The supply-and-demand adjustment amount is an amount of electric power to be consumed or supplied by the supply-and-demand adjustment apparatus in response to an instruction.

PTL 1 describes a method to set a priority order for respective power generators, based on control characteristics and control states thereof, and sequentially to allocate a required amount of power control in descending the order of priority. Specifically, the method disclosed in PTL 1 is expected to realize highly precise responses by sequentially allocating the supply-and-demand adjustment amount from the supply-and-demand adjustment apparatus with smaller delay.

PTL 2 describes a supply and demand control technique for microgrids, to conduct supply and demand adjustment by reflecting respective characteristics of an internal combustion power generating facility and a power storage apparatus.

CITATION LIST

Patent Literature

[PTL 1] Japanese Unexamined Patent Application Publication No. 2001-086649
[PTL 2] Japanese Unexamined Patent Application Publication No. 2011-114900

SUMMARY OF INVENTION

Technical Problem

However, in the method described in PTL 1, while there is an upper limit for a capacity of each supply-and-demand adjustment apparatus, the supply-and-demand adjustment amount, which is allocated to the supply-and-demand adjustment apparatus with smaller delay, becomes larger. Thus, when the supply-and-demand adjustment apparatus with smaller delay are operated at the upper limit of its capacity, the supply-and-demand adjustment amount is allocated to a facility with larger delay. Thereby the precision of the supply and demand adjustment becomes lower. There is also a problem that the supply-and-demand adjustment apparatus with larger delay is not used appropriately and, thus, causing inefficiency.

The method described in PTL 2 is a method that focuses on optimization of start-stop of each supply-and-demand adjustment apparatus. Thus, the method of described PTL 2 does not adequately allocates an amount of the supply and demand adjustment, based on the delay of each supply-and-demand adjustment apparatus. Therefore, the method described in PTL 2 does not guarantee precision with respect to a supply-and-demand adjustment amount which is required.

Thus, the techniques described in PTL 1 and 2 cannot adjust the amount of the total supply and demand adjustment to the required amount of the supply and demand adjustment with high precision, by fully using the characteristics of the respective supply-and-demand adjustment apparatuses, when adjusting supply and demand using a plurality of supply-and-demand adjustment apparatuses.

Therefore, an exemplary objective of the present invention is to adjust the total amount of supply and demand adjustment to the required adjustment amount with high precision by using characteristics of the respective supply-and-demand adjustment apparatuses, when adjusting supply and demand using a plurality of supply-and-demand adjustment apparatuses.

Solution to Problem

A supply and demand adjustment system according to one aspect of the present invention is, a supply and demand adjustment system including a central control apparatus and one or more supply-and-demand adjustment apparatuses, the central control apparatus including: a supply-and-demand-adjustment-apparatus-state-collection unit that collects information relating to a state of each supply-and-demand adjustment apparatus; an allocation band calculation unit that calculates a frequency band and an intensity of a fluctuation of supply and demand adjustment allocated to the supply-and-demand adjustment apparatus based on the state of the supply-and-demand adjustment apparatus; and a supply-and-demand-adjustment-amount-calculation unit that calculates a supply-and-demand adjustment amount for each supply-and-demand adjustment apparatus based on the frequency band and the intensity of the fluctuation of supply and demand adjustment allocated to the supply-and-demand adjustment apparatus.

Advantageous Effects of Invention

According to the present invention, the total amount of supply and demand adjustment can be adjusted to the required adjustment amount with high precision by using of characteristics of the respective supply-and-demand adjustment apparatuses, when adjusting supply and demand using a plurality of supply-and-demand adjustment apparatuses.

DESCRIPTION OF EMBODIMENTS

[First Exemplary Embodiment]
Hereinafter, exemplary embodiments of the present invention will be described in detail with reference to the drawings.

Figure 1:
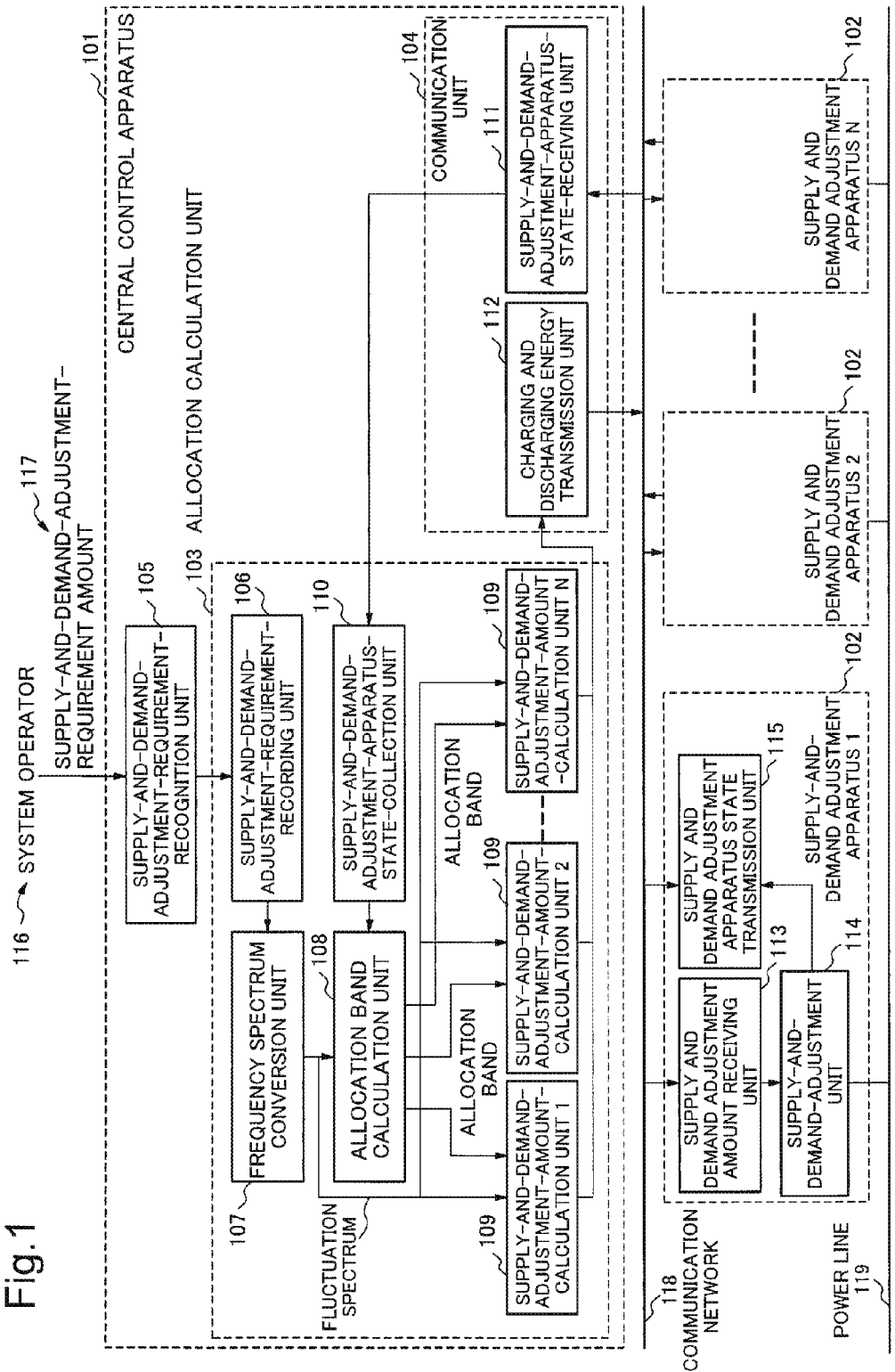
FIG. 1 is a block diagram illustrating a configuration of a supply and demand adjustment system according to a first exemplary embodiment of the present invention.

FIG. 1 is a block diagram illustrating a configuration of a supply and demand adjustment system according to a first exemplary embodiment of the present invention. The supply and demand adjustment system is a system that a central control apparatus 101 assigns the supply-and-demand adjustment amount (such like an amount of power for supply and demand adjustment) to each supply-and-demand adjustment apparatus 102 managed by the central control apparatus 101. An electric power provider (for example, a power system operator 116) who is responsible for adjusting supply and demand, assigns the central control apparatus 101 a supply-and-demand-adjustment-requirement amount (the supply-and-demand adjustment amount required by the power provider) 117 to be realized by adjusting supply and demand. The central control apparatus 101 assigns a supply-and-demand adjustment amount to each supply-and-demand adjustment apparatus 102 so that the total of the supply-and-demand adjustment amount of all the supply-and-demand adjustment apparatuses 102 (the total supply-and-demand adjustment amount) matches (agrees with) the supply-and-demand-adjustment-requirement amount 117.

Each unit included in the central control apparatus 101 may be implemented by hardware configured by combination of logical elements (circuits). Each unit included in the central control apparatus 101 may also be implemented by a CPU 2100 (Central Processing Unit) executing a program stored in a storage apparatus 2300 in an information processing apparatus 2000 illustrated in FIG. 11 described later.

First, the supply-and-demand-adjustment-requirement amount 117 is input to a supply-and-demand-adjustment-requirement-recognition unit 105 in the central control apparatus 101. The supply-and-demand-adjustment-requirement amount 117 includes, for example, the following requirements:

a supply-and-demand-adjustment-requirement amount for Load Frequency Control (LFC) that suppresses a fluctuation of the power system frequency;

a supply-and-demand-adjustment-requirement amount as an alternative to governor free operation;

a supply-and-demand-adjustment-requirement amount for peak cutting; and a supply-and-demand-adjustment-requirement amount that is a combination of the aforementioned plurality of supply-and-demand-adjustment-requirement amount.

The supply-and-demand-adjustment-requirement-recognition unit 105 may include a measurement apparatus to measure a state of the system and calculate the supply-and-demand-adjustment-requirement amount by itself. For example, the supply-and-demand-adjustment-requirement-recognition unit 105 may calculate the supply-and-demand-adjustment-requirement amount necessary for stabilizing the frequency of the system so that the supply-and-demand adjustment apparatus 102 may perform part of the LFC. This calculation is executed based on deviation of the power system frequency from a reference frequency (for example, 50 Hz) and a state of a power generator collected from the upper system.

Further, in order to suppress a fluctuation of a power flow between the power distributing substation and the upper system, the supply-and-demand-adjustment-requirement-recognition unit 105 may measure a power flow at a point where the power flow fluctuation is needed to be suppressed, and calculate a difference between the measured power flow and a target power flow as the amount of supply-and-demand-adjustment-requirement.

An interval, at which the supply-and-demand-adjustment-requirement-recognition unit 105 acquires or calculates a supply-and-demand-adjustment-requirement amount, may be as short as one second or less, depending on the purpose.

The supply-and-demand-adjustment-requirement-recognition unit 105 stores the acquired or calculated supply-and-demand-adjustment-requirement amount in a supply-and-demand-adjustment-requirement-recording unit 106. The supply-and-demand-adjustment-requirement-recording unit 106 stores supply-and-demand-adjustment-requirement amount over a certain period in the past. After receiving a supply-and-demand-adjustment-requirement amount from the supply-and-demand-adjustment-requirement-recognition unit 105, the supply-and-demand-adjustment-requirement-recording unit 106 appends the past supply-and-demand-adjustment-requirement amount to the received supply-and-demand-adjustment-requirement amount and supplies those requirement amount to a frequency spectrum conversion unit 107, as time-series data.

A period, in which the supply-and-demand-adjustment-requirement-recording unit 106 records supply-and-demand-adjustment-requirement amount, is the same as or longer than the period of the past data to be appended when supplying the supply-and-demand-adjustment-requirement amount to the frequency spectrum conversion unit 107. The period is sufficiently longer than a fluctuation cycle of the supply-and-demand-adjustment-requirement amount. In general, in a conventional electric power system, a long-period fluctuation of the supply-and-demand-adjustment-requirement amount is handled by heating up/heating down or starting up/shutting down of a large-scale power generator, such as a thermal power generator. Therefore, many of newly introduced supply-and-demand adjustment apparatuses 102 adjust supply and demand in response to a change of a supply-and-demand-adjustment-requirement amount in a period shorter than the shortest time (several tens of minutes) required for starting up or shutting down of the thermal power generator. Therefore, in many case, the supply-and-demand-adjustment-requirement-recording unit 106 may record the past data for several hours.

Figure 2:
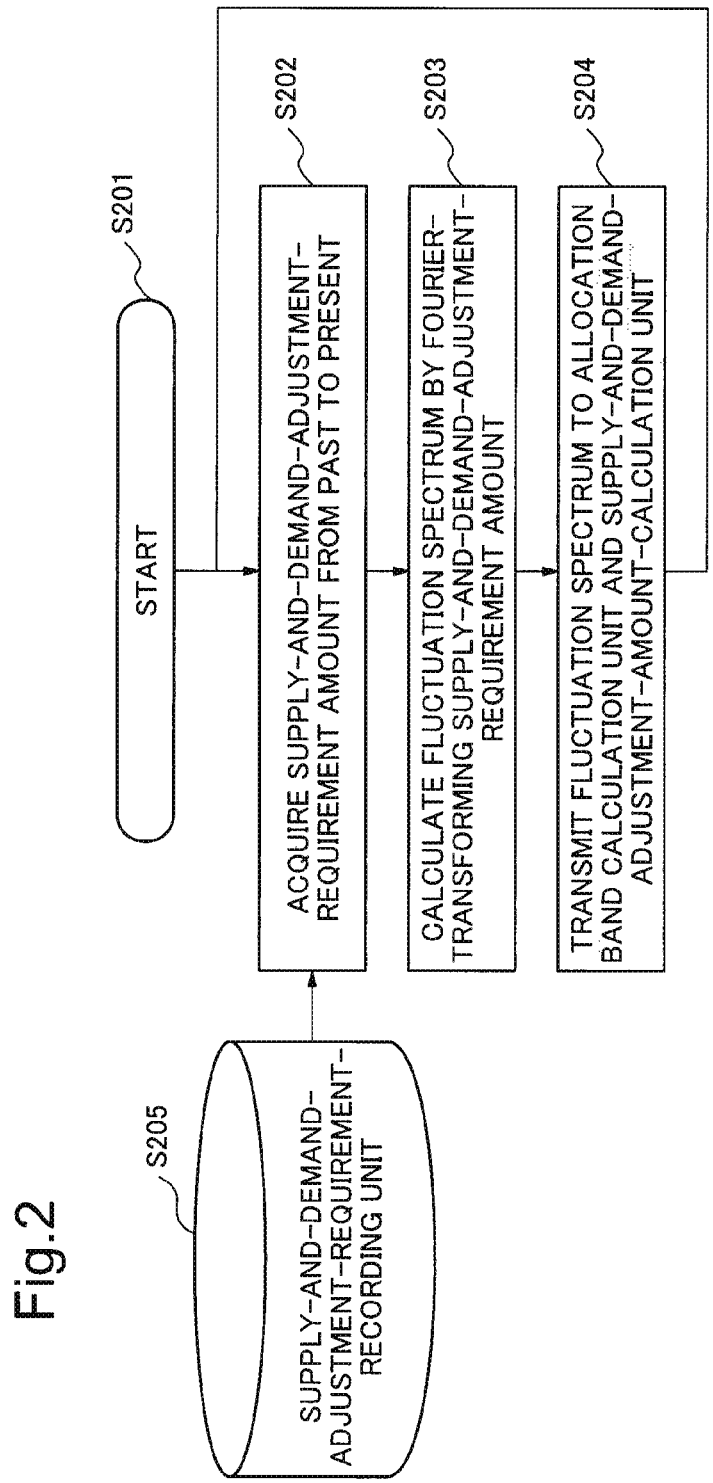
FIG. 2 is a flowchart of an operation of a frequency spectrum conversion unit according to the first exemplary embodiment of the present invention.

Next, an operation of the frequency spectrum conversion unit 107 will be described. FIG. 2 is a flowchart representing processing of the frequency spectrum conversion unit 107.

The frequency spectrum conversion unit 107 acquires time-series data (FIG. 3) of supply and demand adjustment requirement amount from the past to the present from the supply-and-demand-adjustment-requirement-recording unit 106 (Step 202). The frequency spectrum conversion unit 107 executes Fourier-transformation on the acquired time-series data and calculates a fluctuation spectrum (Step 203). The frequency spectrum conversion unit 107 supplies the calculated fluctuation spectrum to an allocation band calculation unit 108 and a supply-and-demand-adjustment-amount-calculation unit 109 (Step 204).

For example, it is assumed that t (t=0 represents the present time) represents time, $f_n$ (unit: Hz) represents a frequency component, $A_n$ (unit: W) represents an intensity corresponding to each frequency component, and $\theta_n$ (unit: degree) represents a phase corresponding to each frequency component (n=1, 2, 3 . . . N). In this case, the frequency spectrum conversion unit 107 executes Fourier-transformation on the supply-and-demand-adjustment-requirement amount $P_{REQUEST}(t)$ as expressed in the following equation (1). In equation (1), "Sin" represents sine.

$$P_{REQUEST}(t)=\Sigma^{n=1,2,3}\ldots{}^{N}A_n\times\mathrm{Sin}(2\pi f_n\times t+\theta_n) \quad (1)$$

Figure 3:
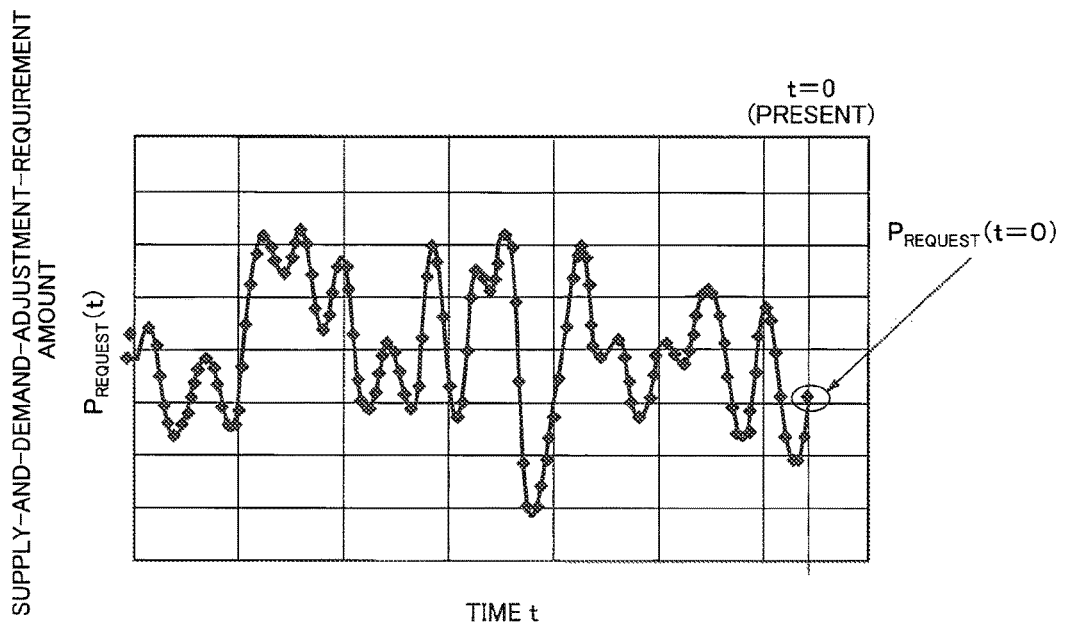
FIG. 3 is a diagram illustrating an example of time-series data of an supply-and-demand-adjustment-requirement amount from the past to the present according to the first exemplary embodiment of the present invention.
Figure 4:
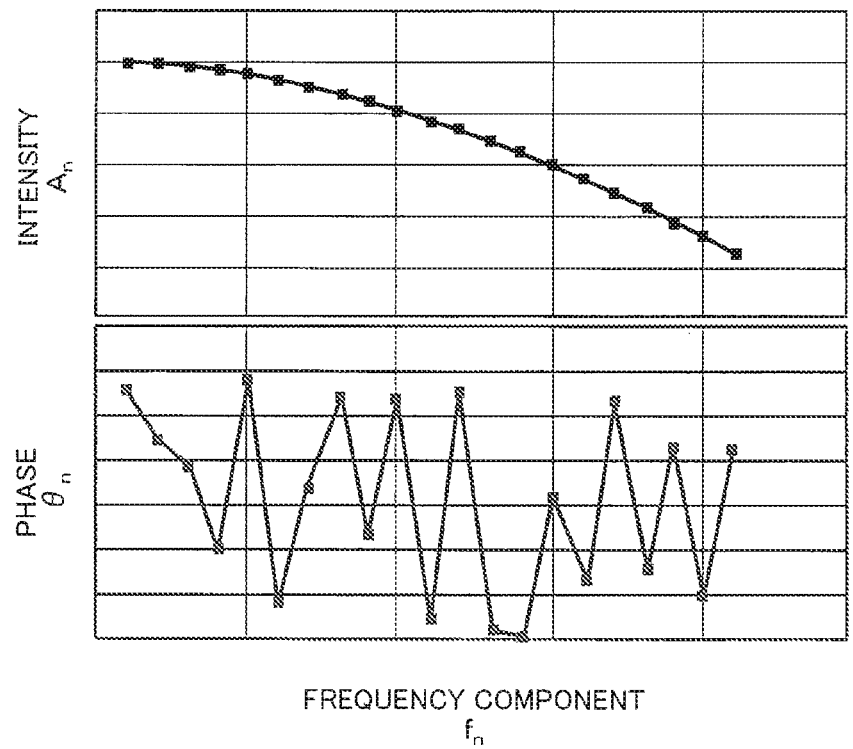
FIG. 4 is a diagram illustrating a result of Fourier-transform of time-series data of a supply-and-demand-adjustment-requirement amount from the past to the present at t=0, according to the first exemplary embodiment of the present invention.

FIG. 4 illustrates a result of Fourier-transformation of the time-series data of supply and demand adjustment requirement amount, from the past to the present indicated in FIG. 3, at t=0. In this case, the transmitted information includes values of $f_n$ and $A_n$ corresponding to $f_n$, and $\theta_n$ at t=0. The notation of a fluctuation spectrum expressed in equation (1) is an example, thus, the fluctuation spectrum may be expressed by other than equation (1). Further, while it is assumed that the frequency component $f_k$, the intensity $A_n$, and the phase $\theta_n$ are discrete values, these values may be continuous values. In the above example, with regard to the $f_n$ that represents a frequency component, it is assumed that $f_1<f_2<f_3<\ldots<f_N$ is satisfied.

A supply-and-demand-adjustment-apparatus-state-collection unit 110 collects a state of each supply-and-demand adjustment apparatus 102 through a supply-and-demand-adjustment-apparatus-state-receiving unit 111. As an example of the state of the supply-and-demand adjustment apparatus 102 to be collected, SoC (State of Charge) may be used when the supply and demand apparatus 102 is a power storage apparatus. Other states of the supply-and-demand adjustment apparatus 102 may include temperature, inverter capacity, and deterioration level. Time taken for changing the SoC value or temperature in the power storage apparatus is sufficiently long compared with an update frequency of a value of the supply-and-demand-adjustment-requirement amount (the update frequency may be in seconds). Therefore the collection frequency may be in several minutes to several tens of minutes.

While not described herein, the supply-and-demand-adjustment-requirement-recording unit 106 and the frequency spectrum conversion unit 107 may be replaced with a filter. Further, although a trigonometrical function in Fourier expansion is used as a base in the aforementioned Fourier transform, it is not always necessary to use the trigonometrical function as the base.

Next, the allocation band calculation unit 108 calculates a frequency band and a ratio to be allocated to each storage battery (allocation band) of a fluctuation spectrum. This calculation is performed based on the fluctuation spectrum acquired by the frequency spectrum conversion unit 107, and state information of the supply-and-demand adjustment apparatus 102 acquired by the supply-and-demand-adjustment-apparatus-state-collection unit 110. The calculated allocation band is supplied to the supply-and-demand-adjustment-amount-calculation unit 109.

In general, the fluctuation spectrum of the supply-and-demand-adjustment-requirement and the state of the supply-and-demand adjustment apparatus 102 do not often change rapidly. Therefore, compared with the update frequency (in seconds) of the value of the supply-and-demand-adjustment-requirement amount, a frequency of calculating and supplying the allocation band may be lower than the update frequency. The frequency of calculating and supplying allocation band may be in several minutes to several tens of minutes. As described above, the state of a supply-and-demand adjustment apparatus 102 does not change rapidly. As for the fluctuation spectrum, the fluctuation of the supply-and-demand-adjustment-requirement amount may be caused by an aggregate of much randomness such as a total of power consumption by consumers, and natural phenomena such as an output of a renewable power supply. Consequently, intensity distribution of the fluctuation spectrum can be basically handled statistically. Therefore, the fluctuation spectrum does not often change rapidly.

The allocation band supplied to the supply-and-demand-adjustment-amount-calculation unit 109 by the allocation band calculation unit 108 is information used by each supply-and-demand-adjustment-amount-calculation unit 109 for calculating the supply-and-demand adjustment amount of the supply-and-demand adjustment apparatus 102 managed by the supply-and-demand-adjustment-amount-calculation unit 109.

Figure 5:
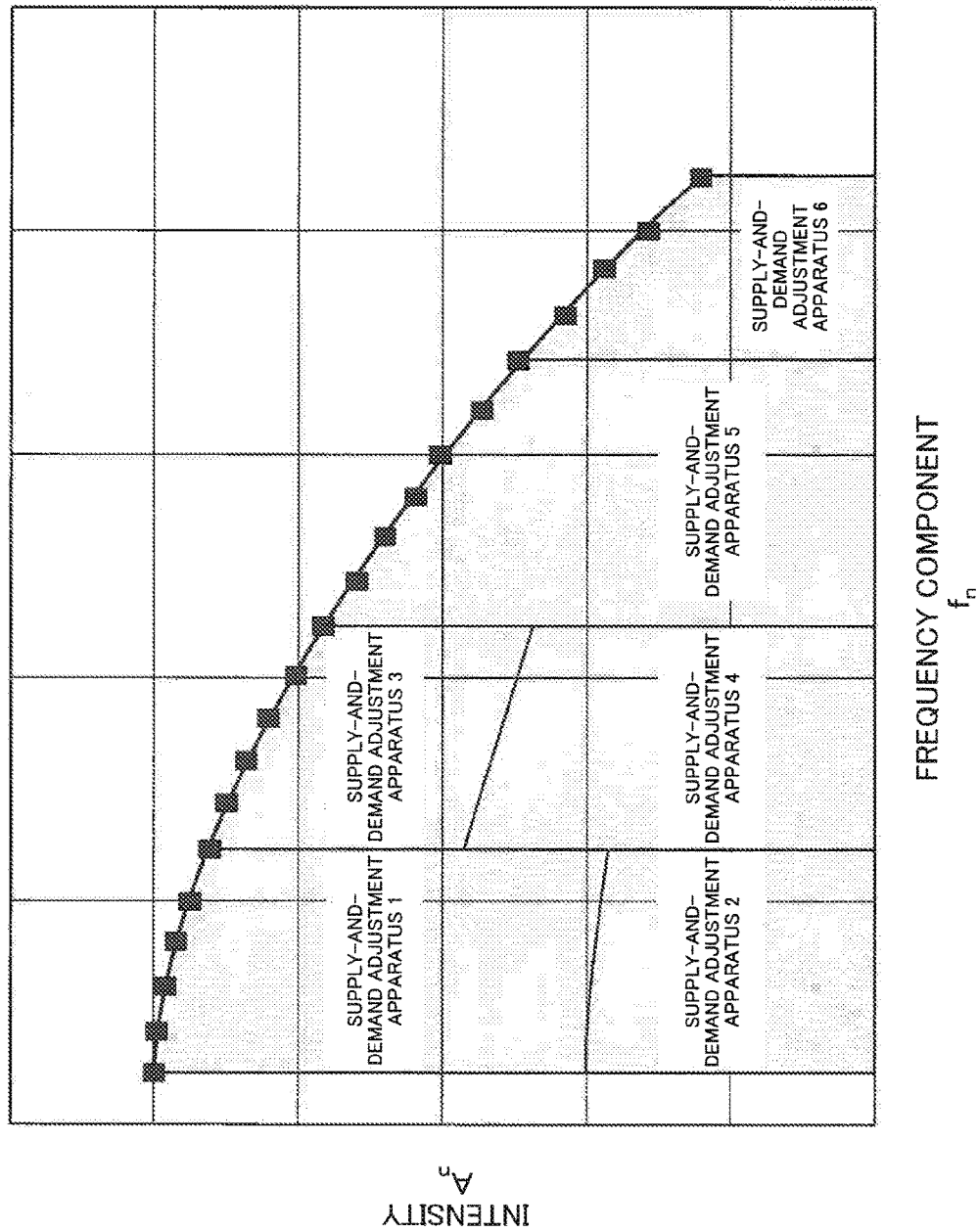
FIG. 5 is a diagram illustrating an example of an allocation band according to the first exemplary embodiment of the present invention.

For example, the allocation band transmitted to a supply-and-demand-adjustment-amount-calculation unit m (m-th supply-and-demand-adjustment-amount-calculation unit 109) is the coefficient $\alpha^m_n$ (n=1, 2, 3 . . . N, each corresponding to the frequency component $f_n$) corresponding to each frequency component. FIG. 5 is a schematic view. In the example of FIG. 5, the fluctuation spectrum in FIG. 4 is assigned to six supply-and-demand adjustment apparatuses 102. While the frequency component $f_k$ and coefficient $\alpha_k$ are assumed as discrete values, these values may be continuous values. The methods of calculating $\alpha^m_n$ in the allocation band calculation unit 108 will be described later.

The supply-and-demand-adjustment-amount-calculation unit 109 calculates $P_m(t)$ in accordance with the following equation (2) using the allocation band $\alpha^m_n$ transmitted with low frequency and the fluctuation spectrum from the past to the present (t=0) transmitted in real time from the frequency spectrum conversion unit 107. As for $\alpha^m_n$, n is the number of a frequency within a fluctuation spectrum where n=1, 2, 3 . . . , and m is the number of a supply-and-demand adjustment apparatus 102 where m=1, 2, 3 . . . , M. Further, the fluctuation spectrum is expressed by the intensity $A_n$ and the phase $\theta_n$ corresponding to the frequency component $f_n$.

$$P_m(t)=\Sigma^{n=1,2,3\cdots N}\alpha^m_n\times A_n\times\text{Sin}(2\pi f_n\times t+\theta_n) \quad (2)$$

Further, the supply-and-demand-adjustment-amount-calculation unit 109 substitutes t=0 in equation (2) and calculates Pm (t=0) as the supply-and-demand adjustment amount of the supply-and-demand adjustment apparatus m.

The allocation band calculation unit 108 determines the allocation band so that $\alpha^m_n$ satisfies equation (3).

$$\Sigma^{m=1,2,3\cdots M}\alpha^m_n=1 \text{(for } n=1,2,3,\ldots,N) \quad (3)$$

Consequently, by substituting equations (2) and (3), $\Sigma^{m=1,2,3\cdots M}P_m(t=0)$ as the sum of the supply-and-demand adjustment amount $P_m$ (t=0) of the supply-and-demand adjustment apparatuses 1 to M can be expressed as the following equation (4).

$$\Sigma^{m=1,2,3\cdots M}P_m(t=0)=\Sigma^{m=1,2,3\cdots M}\Sigma^{n=1,2,3\cdots N}\alpha^m_n\times A_n\times \quad (4)$$
$$\text{Sin}(2\pi f_n\times 0+\theta_n)$$
$$=\Sigma^{n=1,2,3\cdots N}\Sigma^{m=1,2,3\cdots M}\alpha^m_n\times A_n\times$$
$$\text{Sin}(2\pi f_n\times 0+\theta_n)$$
$$=\Sigma^{n=1,2,3\cdots N}A_n\times\text{Sin}(2\pi f_n\times 0+\theta_n)$$

As described above, $\Sigma^{m=1,2,3\cdots M}P_m(t=0)$ as the sum of supply-and-demand adjustment amounts Pm (t=0), matches the right side of $P_{REQUEST}(t)$ (t=0) in equation (1). That is, the sum of supply-and-demand adjustment amounts to all the supply-and-demand adjustment apparatuses 102 matches the supply-and-demand-adjustment-requirement amount.

The supply-and-demand adjustment apparatus 102 transmits the supply-and-demand adjustment amount, transmitted in real time from the supply-and-demand-adjustment-amount-calculation unit 109, to a supply-and-demand-adjustment unit 114, and the supply-and-demand-adjustment unit 114 adjusts supply and demand accordingly.

(First Calculation Method for Allocation Band $\alpha^m_n$)

Next, a method of calculating an allocation band $\alpha^m_n$ in the allocation band calculation unit 108 will be described with an example. As an example of a calculation method, there is a method of calculating the allocation band based on Wh capacity and W capacity of each supply-and-demand adjustment apparatus 102. This method can prevent deviation of the total supply-and-demand adjustment amount from a supply-and-demand-adjustment-requirement amount, due to a part or all of supply-and-demand adjustment apparatuses 102 reaching an upper limit of W capacity or a Wh capacity, or running out of Wh capacity.

Hereinafter, an example, in which the supply-and-demand adjustment apparatus 102 is the power storage apparatus, will be described.

It is assumed that the maximum chargeable and dischargeable electric energy (power) of the power storage apparatus m (m-th power storage apparatus that corresponds to supply-and-demand adjustment apparatus 102) is $C_m$ (Wh). It is also assumed that half of the value of the Wh capacity that can be used by the power storage apparatus m for charging and discharging in accordance with a supply-and-demand-adjustment-requirement amount is $C_{m'}$. When the power storage apparatus is used only for charging and discharging in accordance with a supply-and-demand-adjustment-requirement amount, $C_{m'}$ may be half of the value of the Wh capacity of the power storage apparatus.

When the power storage apparatus is also used for other purposes, $C_{m'}$ is half of the value of a Wh capacity that can be used for charging and discharging in accordance with a supply-and-demand-adjustment-requirement amount. The reason for setting the half value of the Wh capacity to Cm' is as follows. That is, in consideration of both charging and discharging, charged electric power or discharged electric power becomes maximum when the initial state of SoC is 50%. In that case, the charged electric power or the discharged electric power becomes half of the capacity of the power storage apparatus.

Further, the allocation band calculation unit 108 may dynamically set $C_{m'}$ using information transmitted from the supply-and-demand-adjustment-apparatus-state-collection unit 110. For example, it is assumed that a capacity that can be used by the power storage apparatus m for charging and discharging in accordance with a supply-and-demand-adjustment-requirement amount is $C_m$ (Wh), a ratio of stored electricity out of $C_m$ is SoC$_m$ (%), and min(A, B) is a function that returns the smaller value of A and B. In this case, $C_{m'}$ can be defined by the following equation (5).

$$C_{m'}=\min(C_m\times\text{SoC}_m/100, C_m\times(1-\text{SoC}_m/100)) \quad (5)$$

Figure 6:
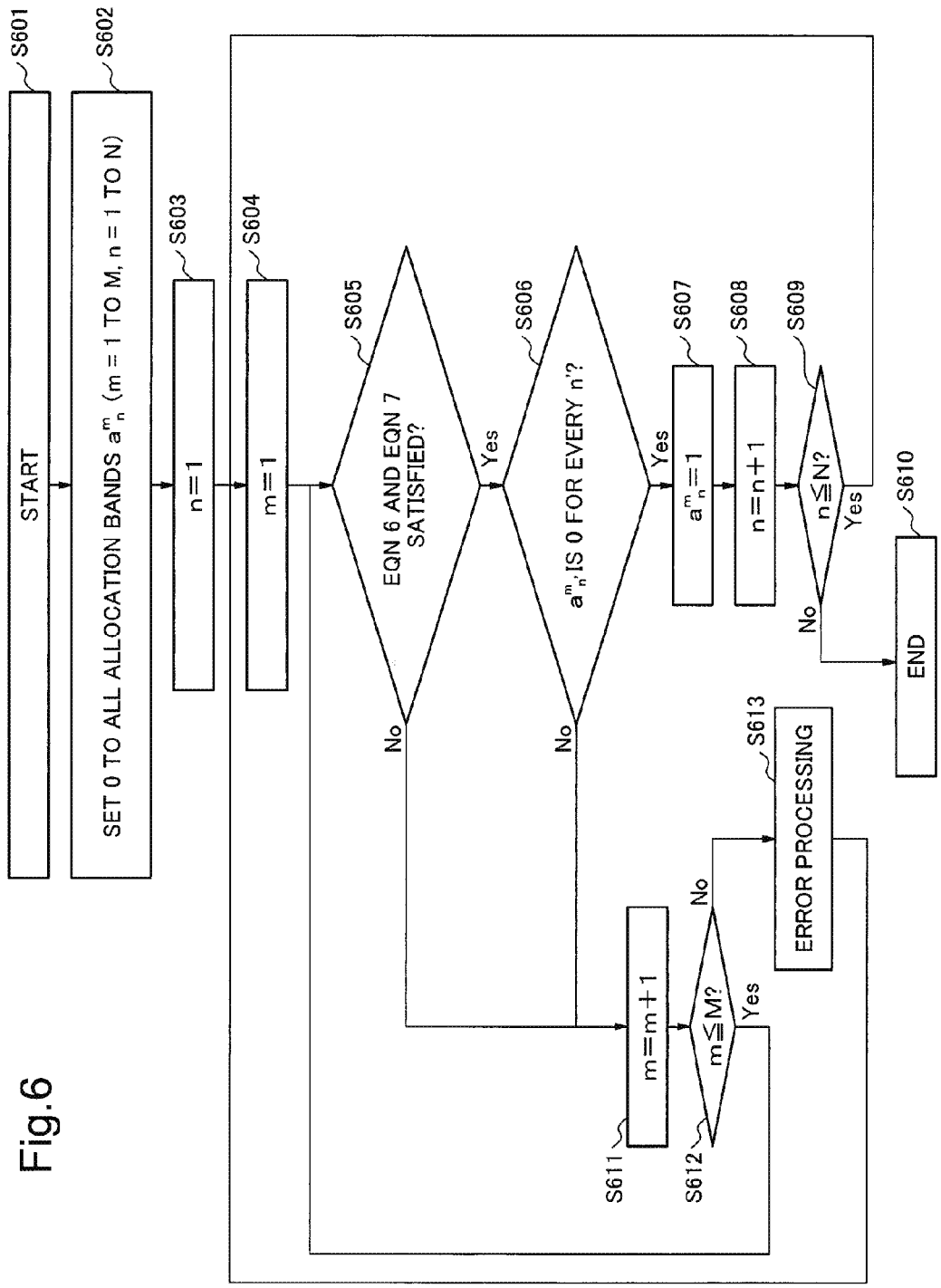
FIG. 6 is a flowchart illustrating a method of calculating an allocation band $\alpha^m_n$ of a supply-and-demand adjustment apparatus according to the first exemplary embodiment of the present invention.

FIG. 6 is a flowchart representing a method of calculating the allocation band $\alpha^m_n$ of the power storage apparatus. In the method illustrated in FIG. 6, with respect to each frequency component $f_n$(Hz) of the fluctuation spectrum of the supply-and-demand-adjustment-requirement amount, the allocation band calculation unit 108 sets $\alpha^m_n=1$ (Step 607) for the power storage apparatus that satisfies the following equations (6) and (7) (Step 605), and also satisfies $\alpha^m_{n'}=0$ (n'=1 to N) (Step 606). $W_m$ (W) is the W capacity of the power storage apparatus m.

$$(1/(\pi\times f_m\times 3600))\times A_m\leq C_{m'} \quad (6)$$

$$W_m\leq A_m \quad (7)$$

In equation (6), it is assumed that, for each frequency component $f_k$(Hz) of the fluctuation spectrum of the supply-and-demand-adjustment-requirement amount, the intensity of the frequency component is $A_k$(W).

In the above described example, single supply-and-demand adjustment apparatus 102 is allocated to one frequency band. However one frequency band may be allocated to a plurality of storage batteries. Alternatively, single supply-and-demand adjustment apparatus 102 may handle the fluctuation in a plurality of frequency components.

An example of assigning one frequency band to a plurality of storage batteries will be described below.

Figure 7:
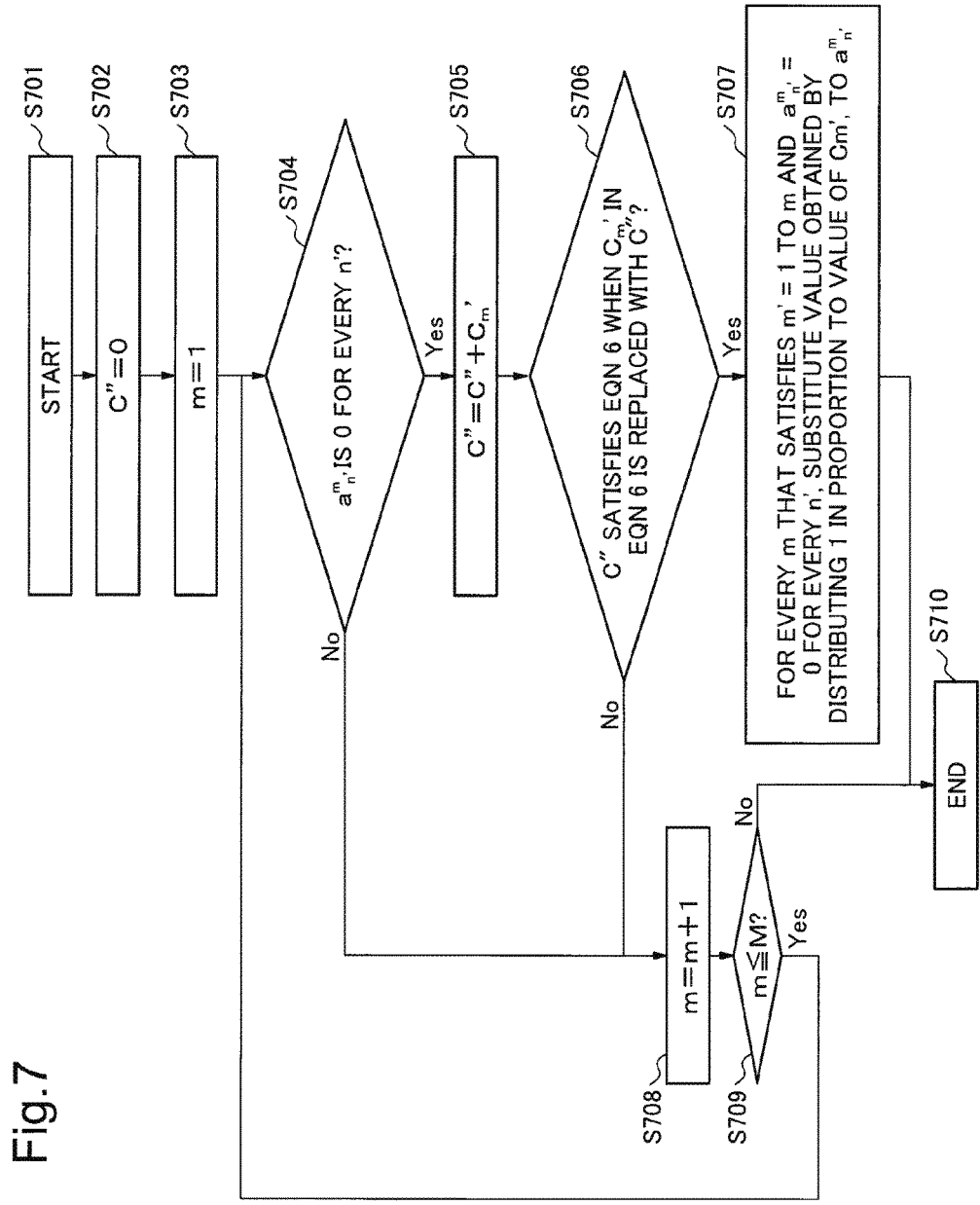
FIG. 7 is a flowchart illustrating an example of error processing illustrated in FIG. 6 according to the first exemplary embodiment of the present invention.

When there is no power storage apparatus that satisfies equations (6) and (7) and $\alpha^m_{n'}=0$ for $n'=1$ to N, the processing example illustrated in FIG. 6 cannot handle the case, and error processing is performed. FIG. 7 is a flowchart of an example of this error processing. In this example, an error is handled by absorbing a fluctuation of one frequency band by combining a plurality of power storage apparatuses.

The example illustrated in FIG. 7 represents processing when there is sufficient W capacity. The allocation band calculation unit 108 first extracts a plurality of power storage apparatuses among power storage apparatuses satisfying $\alpha^m_{n'}=0$ for $n'=1$ to N (Step 704). Next, the allocation band calculation unit 108 calculates C'' as the sum of C'' and $C_m'$ (step 705). And the allocation band calculation unit 108 creates a combination of power storage apparatuses so as to satisfy equation (6) when C' in equation (6) is replaced with C'' (Step 706). Further, the allocation band calculation unit 108 substitutes a value obtained by distributing 1 in proportion to a size of $C_m'$, to each $\alpha^m_n$ (Step 707).

Figure 8:
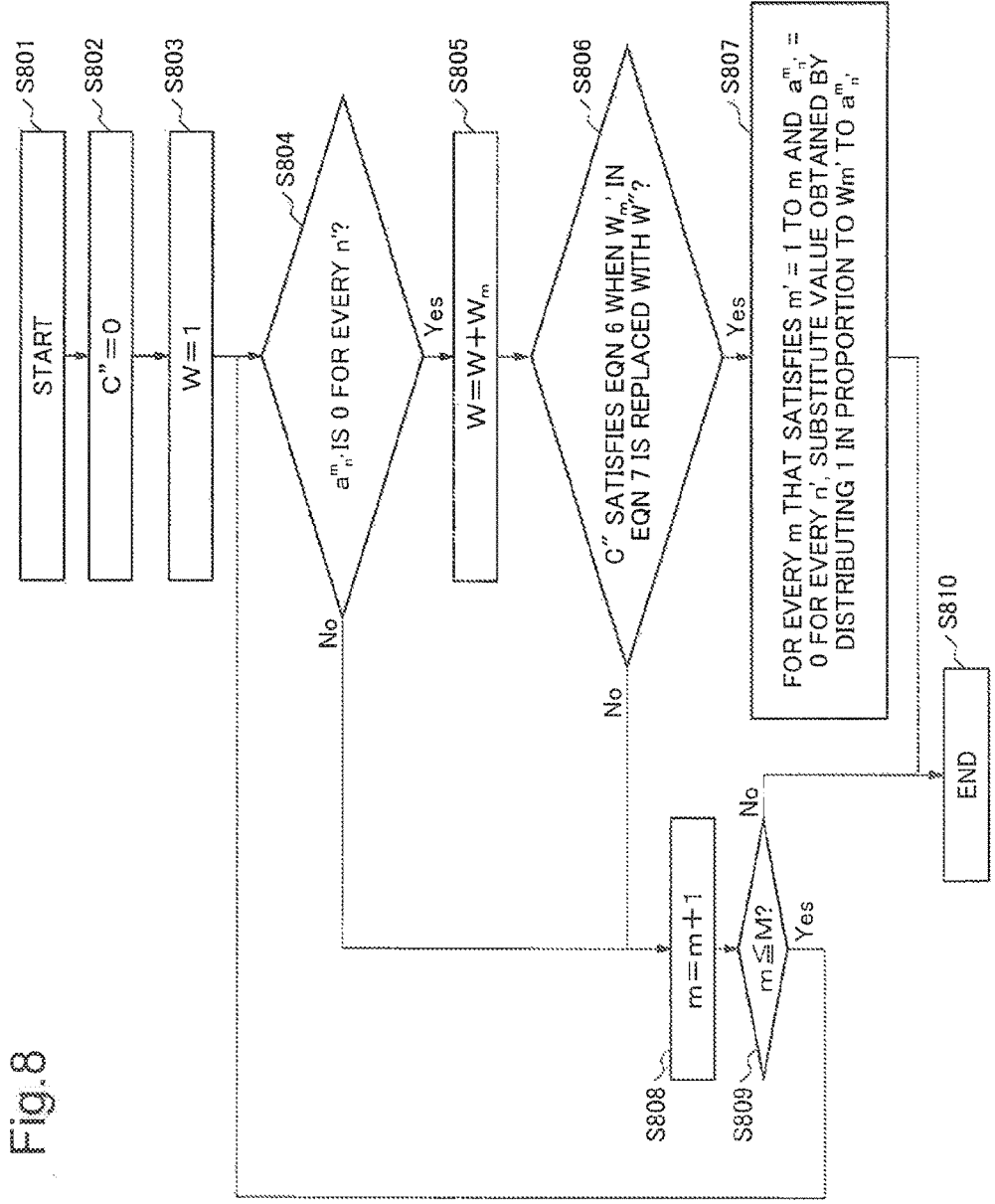
FIG. 8 is a flowchart illustrating an example of error processing illustrated in FIG. 6 according to the first exemplary embodiment of the present invention.

FIG. 8 is a flowchart of another example of error processing. In this example, it is assumed that $C_m'$ is sufficiently large. The allocation band calculation unit 108 extracts a plurality of power storage apparatuses among power storage apparatuses satisfying $\alpha^m_{n'}=0$ for $n'=1$ to N (Step 804). The allocation band calculation unit 108 calculates W as the sum of W and $W_m$ (Step 805). Then, the allocation band calculation unit 108 creates a combination of power storage apparatuses so as to satisfy equation (7) when $W_m$ in equation (7) is replaced with W (Step 806). Further, the allocation band calculation unit 108 substitutes a value obtained by distributing 1 in proportion to a size of $W_m$, to each $\alpha^m_n$ (Step 807).

The reason that the aforementioned allocation band $\alpha^m_n$ calculation method is effective will be described below.

Specifically, the reason that setting the allocation band $\alpha^m_n$ by the aforementioned method can prevent a part or all of supply-and-demand adjustment apparatuses 102 from reaching an upper limit of its capacity or a shortage of capacity is as follows.

Herein, it is assumed that the supply-and-demand adjustment apparatus m adjusts supply and demand only for a frequency component $f_n'$ (Hz) of the fluctuation spectrum of the supply-and-demand-adjustment-requirement amount. That is, a relationship expressed in the following equation (8) is established.

$$\alpha^m_n = 1 \text{ for } n=n', \ 0 \text{ for } n \neq n' \quad (8)$$

When it is assumed that the intensity $A_n$ of the spectrum is constant in the order of several minutes to several tens of minutes, and there is no change in phase, that is, "$\theta_n$=constant", changing over time of the supply-and-demand adjustment amount $P_m$ of the supply-and-demand adjustment apparatus m can be expressed in equation (9).

$$P_m(t) = \alpha^m_n \times A_n \times \operatorname{Sin}(2\pi f_n \times t + \theta_{n'}) \quad (9)$$

The electric power stored in the supply-and-demand adjustment apparatus m is a value obtained by time integration of equation (9). By integrating equation (9) with respect to arbitrary time, the maximum value and the minimum value of the integration value respectively becomes "$+A_n/(\pi \times f_{n'})$", and "$-A_n/(\pi \times f_{n'})$" (unit: W second). Therefore, as expressed in equation (6), when the stored electric power is smaller than the maximum chargeable or dischargeable electric energy $C_m \times 3600$ (W seconds), the power storage apparatus does not go into a state of reaching upper limit of its capacity or a capacity shortage.

However, the change in phase may occur and $\theta_{n'}$ may be not constant in reality. Further, the change in phase tends to occur randomly. This is because the supply-and-demand-adjustment-requirement amount is a requirement amount caused by a change in a consumer demand or an output fluctuation of the renewable power supply. Therefore, all phases are considered to appear evenly during a certain period of time. That is, in general, because a term with regard to the phase change is averaged, the term need not to be considered. However, since all phases do not necessarily appear evenly during a short period of time, the left side of equation (6) may be multiplied by a constant larger than 1 for safety.

(Second Calculation Method for Allocation Band $\alpha^m_n$)

Next, an example of another method of calculating the allocation band $\alpha^m_n$ in the allocation band calculation unit 108 will be described. As an example of a method of calculating the allocation band, there is a method of calculating the allocation band based on a delay and W capacity of each supply-and-demand adjustment apparatus 102. In this method, deviation of the total supply-and-demand adjustment amount from the supply-and-demand-adjustment-requirement amount can be prevented.

There is a delay between the time when the supply-and-demand-adjustment-requirement-recognition unit 105 acquires the supply-and-demand-adjustment-requirement amount 117 and the time when the supply-and-demand-adjustment unit 114 in the supply-and-demand adjustment apparatus 102 operates to adjust supply and demand. Causes of delay may include a delay in communication, calculation, and operation of the supply-and-demand-adjustment unit 114 itself, and the like. When delay, between the time when the supply and demand adjustment is required and the time when the supply and demand adjustment is actually performed, becomes large, the total supply-and-demand adjustment amount as a target cannot be achieved, thereby decreasing the effect of supply and demand adjustment. Further, there may be a case that an oscillation phenomenon may occur, and the system is affected adversely.

In this calculation method, an adverse influence caused by delay is reduced, and an actual error of the total supply-and-demand adjustment amount relative to a supply-and-demand-adjustment-requirement amount is contained within x %.

In this example, the allocation band calculation unit 108 transmits an allocation band $\alpha^m_n$ to the supply-and-demand-adjustment-amount-calculation unit 109 with low frequency. This transmission is based on the fluctuation spectrum supplied in real time by the frequency spectrum conversion unit 107 and a delay $\Delta t_m$ of the supply-and-demand adjustment apparatus m (m=1 to M) supplied with low frequency by the supply-and-demand-adjustment-apparatus-state-collection unit 110. The fluctuation spectrum is the intensity $A_n$ and the phase $\theta_n$ corresponding to the frequency component $f_n$ from the past to the present for n=1 to N.

It is assumed that the total delay between the time when the supply-and-demand-adjustment-requirement-recognition unit 105 acquires the supply-and-demand-adjustment-requirement amount 117 and the time when the supply-and-demand-adjustment unit 114 in the supply-and-demand adjustment apparatus 102 operates to adjust supply and demand is $\Delta t_m$. $\Delta t_m$ is collected by the supply-and-demand-adjustment-apparatus-state-collection unit 110 from the supply-and-demand adjustment apparatus 102.

A method of measuring $\Delta t_m$ may include, for example, the following method.

A wattmeter is installed on an interconnection line between the supply-and-demand-adjustment unit 114 and the power system line. And the supply-and-demand-adjustment-requirement-recognition unit 105 and the supply-and-demand adjustment apparatus 102 respectively includes the synchronized clocks. Then, the supply-and-demand-adjustment-requirement-recognition unit 105 sets timestamps to the supply-and-demand-adjustment-requirement amount, and separately transmits the timestamp when transmitting information in each processing up to the processing of the supply-and-demand-adjustment unit 114 adjusting supply and demand. The supply-and-demand adjustment apparatus 102 measures time when measured value of the wattmeter matches an instruction value directed to the supply-and-demand-adjustment unit 114. The supply-and-demand adjustment apparatus 102 compares the measured time with the transmitted timestamp, and calculates delay time.

Figure 9:
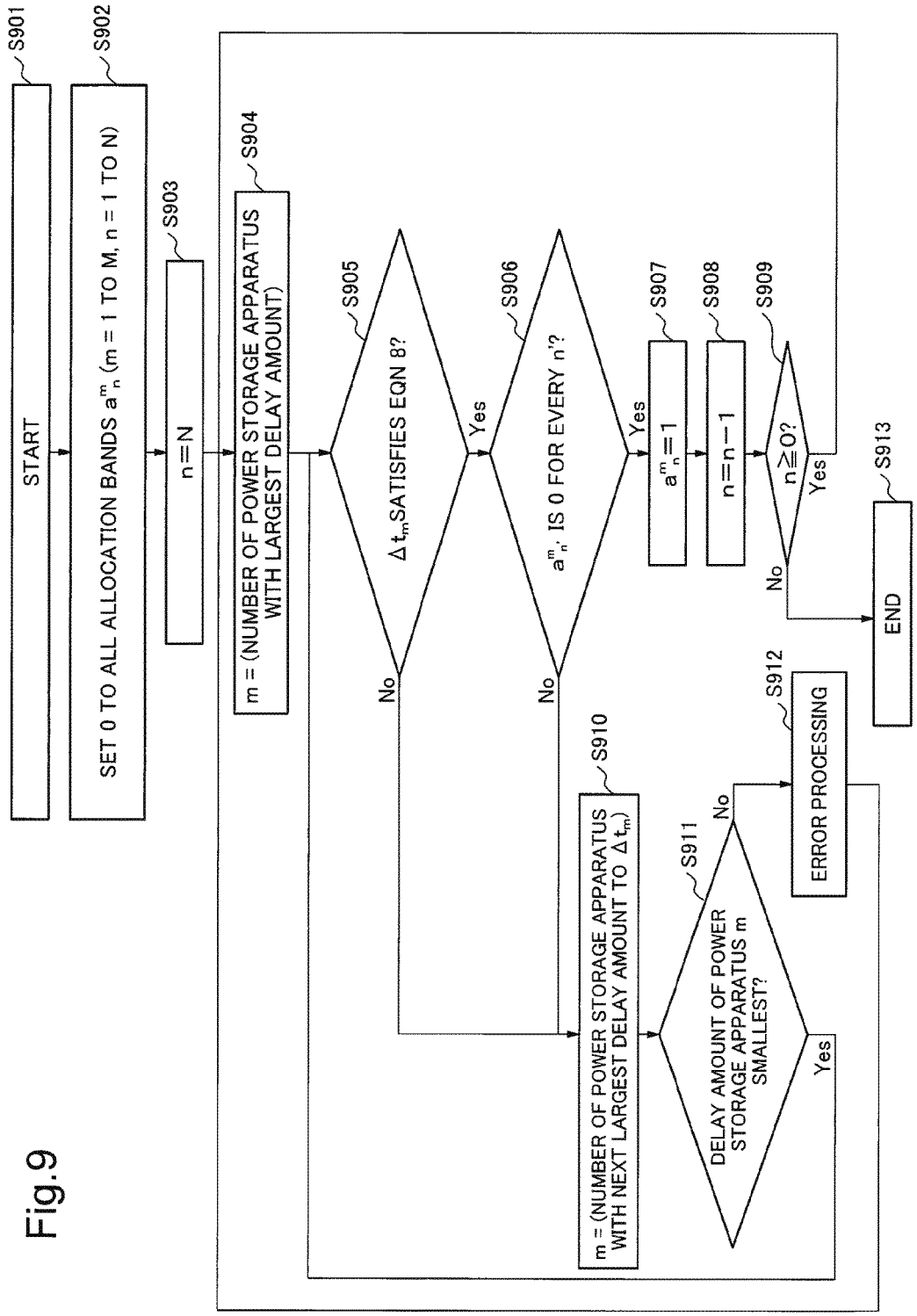
FIG. 9 is a flowchart of another example illustrating a method of calculating an allocation band $\alpha^m_n$ of a supply-and-demand adjustment apparatus according to the first exemplary embodiment of the present invention.

FIG. 9 is a flowchart representing a method of calculating an allocation band $\alpha^m_n$ of the power storage apparatus. With respect to each frequency component $f_n$ of the fluctuation spectrum of the supply-and-demand-adjustment-requirement amount, in descending order of the value of n, the allocation band calculation unit 108 selects the power storage apparatus m having the largest $\Delta t_m$ among power storage apparatuses that satisfy the following equation (10) and equation (7), and satisfy $\alpha^m_{n'}=0$ for n'=1 to N. Then, the allocation band calculation unit 108 sets $\alpha^m_n=1$ for the power storage apparatus m. The unit of the frequency component $f_n$ is Hz. Further, it is assumed that a relationship among the respective frequency components satisfies $f_1<f_2<f_3<\ldots<f_N$.

$$2\pi f_n \Delta t_m \leq x/100 \quad (10)$$

In an example described above, the single supply-and-demand adjustment apparatus 102 is allocated to one frequency band. However, one frequency band may be allocated to a plurality of storage batteries, or a single supply-and-demand adjustment apparatus 102 may handle the fluctuation of a plurality of frequency components.

Hereinafter, a case of allocating one frequency band to a plurality of supply-and-demand adjustment apparatuses 102 will be described. When there is no power storage apparatus that satisfies equations (7) and (10) and satisfies $\alpha^m_{n'}=0$ for n'=1 to N, the example illustrated in FIG. 9 cannot handle the case and error processing is performed.

An error can be avoided by absorbing the fluctuation of one frequency band by combining a plurality of power storage apparatuses. Specifically, it is assumed that, by considering a plurality of supply-and-demand adjustment apparatuses 102 as a single battery, $\Delta t_m$ of the battery with the largest delay among the supply-and-demand adjustment apparatuses 102 is set as a new delay. Further, the sum of W capacity of the supply-and-demand adjustment apparatuses 102 is set as new W capacity, so as to satisfy equation (7). In this case, a single frequency band is allocated to a plurality of supply-and-demand adjustment apparatuses 102.

Further, as another example of error processing, following processing may be executed. That is, by determining that a supply-and-demand-adjustment-requirement amount and the total supply-and-demand adjustment amount cannot be matched within an error range of x, the value of x may be slightly increased. And the processing illustrated in FIG. 9 may be performed again to minimize the error.

The reason that the aforementioned allocation band $\alpha^m_n$ calculation method is effective will be described below.

The reason that the supply-and-demand-adjustment-requirement amount and the total supply-and-demand adjustment amount can be matched within an error range x, by setting the allocation band $\alpha^m_n$ by the aforementioned method is as follows.

It is assumed that the supply-and-demand adjustment apparatus m adjusts supply and demand only for the frequency component $f_{n'}$ (Hz) of the fluctuation spectrum of a supply-and-demand-adjustment-requirement amount. Thus, the following equation (11) is satisfied.

$$\alpha^m_n=1 \text{ for } n=n' \text{ 0 for } n\neq n' \quad (11)$$

The intensity $A_n$ of the spectrum is constant in the order of several minutes to several tens of minutes. Further, when there is no change in phase, that is, "$\theta_n$=constant", changing in time of a supply-and-demand adjustment amount $P_m$ of the supply-and-demand adjustment apparatus m can be expressed in equation (12).

$$P_m(t)=\alpha^m_n \times A_n \times \sin(2\pi f_n \times t+\theta_{n'}) \quad (12)$$

A change rate of $P_m(t)$ can be expressed as the following equation (13) by differentiating equation (12) with respect to t. In equation (13), "Cos" represents cosine.

$$dP_m(t)/dt = 2\pi f_{n'} \times \alpha^m_{n'} \times A_{n'} \times \cos(2\pi f_{n'} \times t + \theta_{n'}) \quad (13)$$
$$= 2\pi f_{n'} \times P_m(t)$$

When the value of $\Delta t_m$ is sufficiently small, deviation from a target caused by delay can be expressed as "$dP_m(t)/dt \times \Delta t_m$". And equation (14) can be obtained by expressing the deviation as a ratio with regard to $P_m(t)$.

$$(dP_m(t)/dt)\times \Delta t_m/P_m(t)=2\pi f_n \Delta t_m \quad (14)$$

When the right side of equation (14) is smaller than "x/100" for every n, the supply-and-demand-adjustment-requirement amount matches the total supply-and-demand adjustment amount within an error range of x. Therefore, since equation (10) is satisfied for every n, the supply-and-demand-adjustment-requirement amount matches the total supply-and-demand adjustment amount within an error range of x.

(Third Calculation Method for Allocation Band $\alpha^m_n$)

An example of another method of calculating an allocation band $\alpha^m_n$ in the allocation band calculation unit 108 will be described. The exemplary objective of the aforementioned first calculation method is to avoid shortage of Wh capacity and W capacity. However the first calculation method ignores deviation between a supply-and-demand-adjustment-requirement amount and the total supply-and-demand adjustment amount caused by delay. Therefore, low-delay control is required to reduce the deviation in the first calculation method.

The exemplary objective of the aforementioned second calculation method is to avoid shortage of W capacity and deviation between a supply-and-demand-adjustment-requirement amount and the total supply-and-demand adjustment amount caused by delay. However, in the second calculation method, Wh capacity is ignored, and sufficient Wh capacity is required to avoid deviation between a supply-and-demand-adjustment-requirement amount and the total supply-and-demand adjustment amount.

Those conditions such as low-delay operations, sufficient W capacity and sufficient Wh capacity may not necessarily be satisfied in reality. Therefore, an example of a method of calculating the allocation band $\alpha^m_n$, that is effective when delay exists, and W capacity and Wh capacity are not sufficient, will be described below.

The third calculation method determines the $\alpha^m_n$, for each frequency band, so as to satisfy all of equation (6) which is a condition for satisfying the first calculation method, equation (9) which is a condition for satisfying the second calculation method, and equation (7) which is a condition for W capacity. At the same time, in addition to the single supply-and-demand adjustment apparatus 102, a combination of two or more supply-and-demand adjustment apparatuses 102 are extracted, among the supply-and-demand adjustment apparatuses 1 to M. A combination of two or more supply-and-demand adjustment apparatuses 102 is considered as a new single supply-and-demand adjustment apparatus 102.

Meanwhile, it is assumed that $C_m'$ in equation (6) represents the sum of each Cm' of the supply-and-demand adjustment apparatuses 102 in combination, and $\Delta t_m$ in equation (9) represents the maximum $\Delta t_m$ among the supply-and-demand adjustment apparatuses 102 in combination. Further, it is assumed that W capacity represents the total W capacity of the supply-and-demand adjustment apparatuses 102 in combination.

The allocation band calculation unit 108 uses the single supply-and-demand adjustment apparatus 102 or the combination of two or more supply-and-demand adjustment apparatuses 102 to find an $\alpha^m_n$ that satisfies equations (6), (7), and (9). Thus, the finding method is formulated as a combinational optimization problem. Specifically, methods such as a genetic algorithm, tabu search, simulated annealing, simulated evolution, and the like, can be used.

[Second Exemplary Embodiment]

Figure 10:
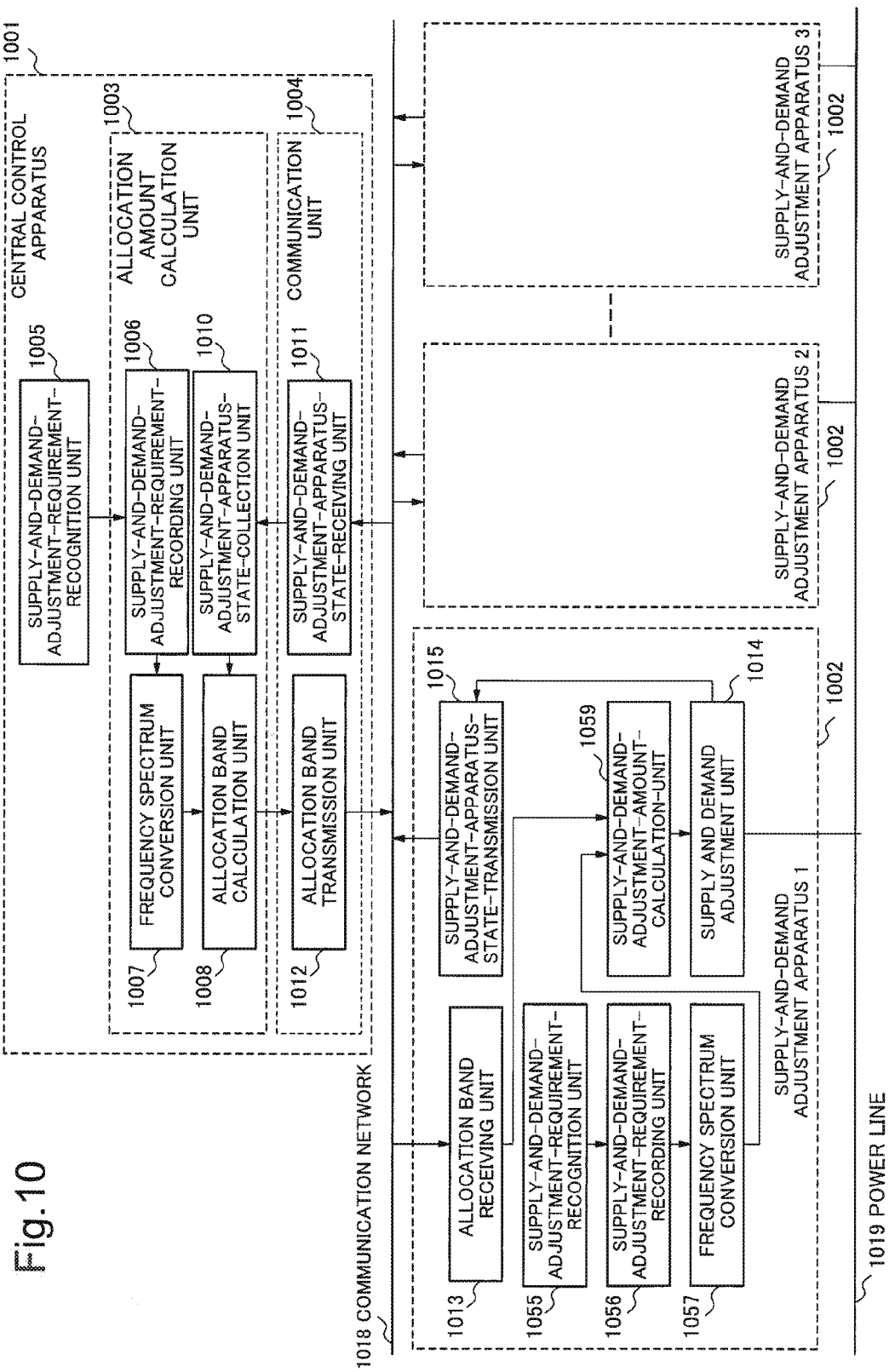
FIG. 10 is a block diagram illustrating a configuration of a supply and demand adjustment system according to a second exemplary embodiment of the present invention.

FIG. 10 is a block diagram illustrating a configuration of a supply and demand adjustment system according to a second exemplary embodiment of the present invention. In the first exemplary embodiment, the central control apparatus 101 transmits the supply-and-demand adjustment amount of each supply-and-demand adjustment apparatus 102 via communication means 118 in real time. This method is applicable when the central control apparatus 101 does not fail and reliability of communication is high (low delay and no disruption). That is, a system that uses the control apparatus 101 realizing high reliability by implementing measures such as redundant configuration, and uses a dedicated line to connect the central control apparatus 101 and the supply-and-demand adjustment apparatus 102, may correspond to such a case.

However, when the number of supply-and-demand adjustment apparatuses 102 becomes large, it is difficult to connect all the supply-and-demand adjustment apparatuses 102 and the central control apparatus 101 through dedicated lines. Thus, use of public lines such as the Internet may also be considered. In that case, delay in communication becomes large, and, consequently, the desired supply-and-demand-adjustment-requirement amount may not be realized even by employing the "second calculation method for allocation band $\alpha^m_n$." Further, when a failure of the central control apparatus 101 or a failure of communication occurs, operations of all the supply-and-demand adjustment apparatuses 102 may be suspended. Thereby, capacity for adjusting supply and demand is wasted.

As illustrated in FIG. 10, in the second exemplary embodiment, each supply-and-demand adjustment apparatus 1002 includes a supply-and-demand-adjustment-requirement-recognition unit 1055, a supply-and-demand-adjustment-requirement-recording unit 1056, a frequency spectrum conversion unit 1057, and a supply-and-demand-adjustment-amount-calculation unit 1059.

Consequently, transmission of information between a central control apparatus 1001 and the supply-and-demand adjustment apparatus 1002 using communication network 1018 is limited to the following two cases.

One is transmission of an allocation band from the central control apparatus 1001 to the supply-and-demand adjustment apparatus 1002. The other is transmission of a state of supply-and-demand adjustment apparatus from the supply-and-demand adjustment apparatus 1002 to the central control apparatus 1001. The supply-and-demand adjustment apparatus 1002 adjusts supply and demand in a supply-and-demand-adjustment unit 1014 only for a portion which is indicated in the allocation band, among the supply-and-demand adjustment amount acquired by the supply-and-demand-adjustment-requirement-recognition unit 1055.

When the allocation band calculation unit 1008 employs the second or third calculation method for allocation band $\alpha^m_n$, $\Delta t_m$ representing delay time is time from recognition of the supply-and-demand adjustment amount by the supply-and-demand-adjustment-requirement-recognition unit 1055 in the supply-and-demand adjustment apparatus 1002, until the supply-and-demand-adjustment unit 1014 achieves a target supply-and-demand adjustment amount. That is, the delay time is obtained by subtracting time needed for communication, from the result in the first exemplary embodiment.

The reason that tolerance against a failure of the central control apparatus 1001 or delay on the communication network 1018 can be increased by the present exemplary embodiment will be described below.

Similar to the first exemplary embodiment, frequency of communication between the central control apparatus 1001 and the supply-and-demand adjustment apparatus 1002 is in several minutes to several tens of minutes, which is relatively low compared with frequency of the supply-and-demand adjustment apparatus 1002 changing values of charging and discharging. Therefore, as long as delay in communication is smaller than frequency of communication which is in the order of several minutes to several tens of minutes, deviation between the supply-and-demand-adjustment-requirement amount and the total supply-and-demand adjustment amount does not occur.

Further, even when the central control apparatus 1001 stops operation due to a failure or the like, or a communication failure occurs, deviation between a supply-and-demand-adjustment-requirement and the total supply-and-demand adjustment amount does not occur as long as the failure is restored within time smaller than the order of several minutes to several tens of minutes.

For example, in order to absorb a fluctuation of the supply and demand amount caused by the renewable power supply and the like, the supply-and-demand-adjustment-requirement-recognition unit 1055 may measure voltage of a power line 1019 and, based on the voltage, estimate the supply and demand amount in the entire area.

Further, for example, in order to absorb a fluctuation of the supply and demand amount caused by solar power generation, the supply-and-demand-adjustment-requirement-recognition unit 1055 may measure solar radiation in the area using a pyranometer and, based on the reading, estimate an amount of power generated by the renewable power supplies in the entire area.

Further, for example, the central control apparatus 1001 or an upper system that transmits the supply-and-demand-adjustment-requirement amount to the central control apparatus 1001 (for example, a load dispatching office of an electricity power provider) may broadcast to the supply-and-demand-adjustment-requirement-recognition unit 1055 with a highly reliable communication method. In such a case, since only unidirectional communication is required, low cost communication methods can be used. For example, as a low cost and highly reliable communication method, wireless communication such as the radio can be used.

Methods for calculating Allocation band $\alpha^m{}_n$ are not limited to those described herein. For example, there is a method for calculating allocation band $\alpha^m{}_n$ that prevents deterioration of batteries. When the supply-and-demand adjustment apparatus 102 and the supply-and-demand adjustment apparatus 1002 are storage batteries, adjusting supply and demand causes deterioration, such as decrease in capacity or increase in internal resistance. A degree of deterioration largely differs depending on temperature and a value of SoC. Thus, a calculation method that realizes a supply-and-demand-adjustment-requirement while collecting parameters relating to deterioration representing a state of the supply-and-demand adjustment apparatus and minimizing the deterioration may be employed as the method for calculating allocation band $\alpha^m{}_n$.

Figure 11:
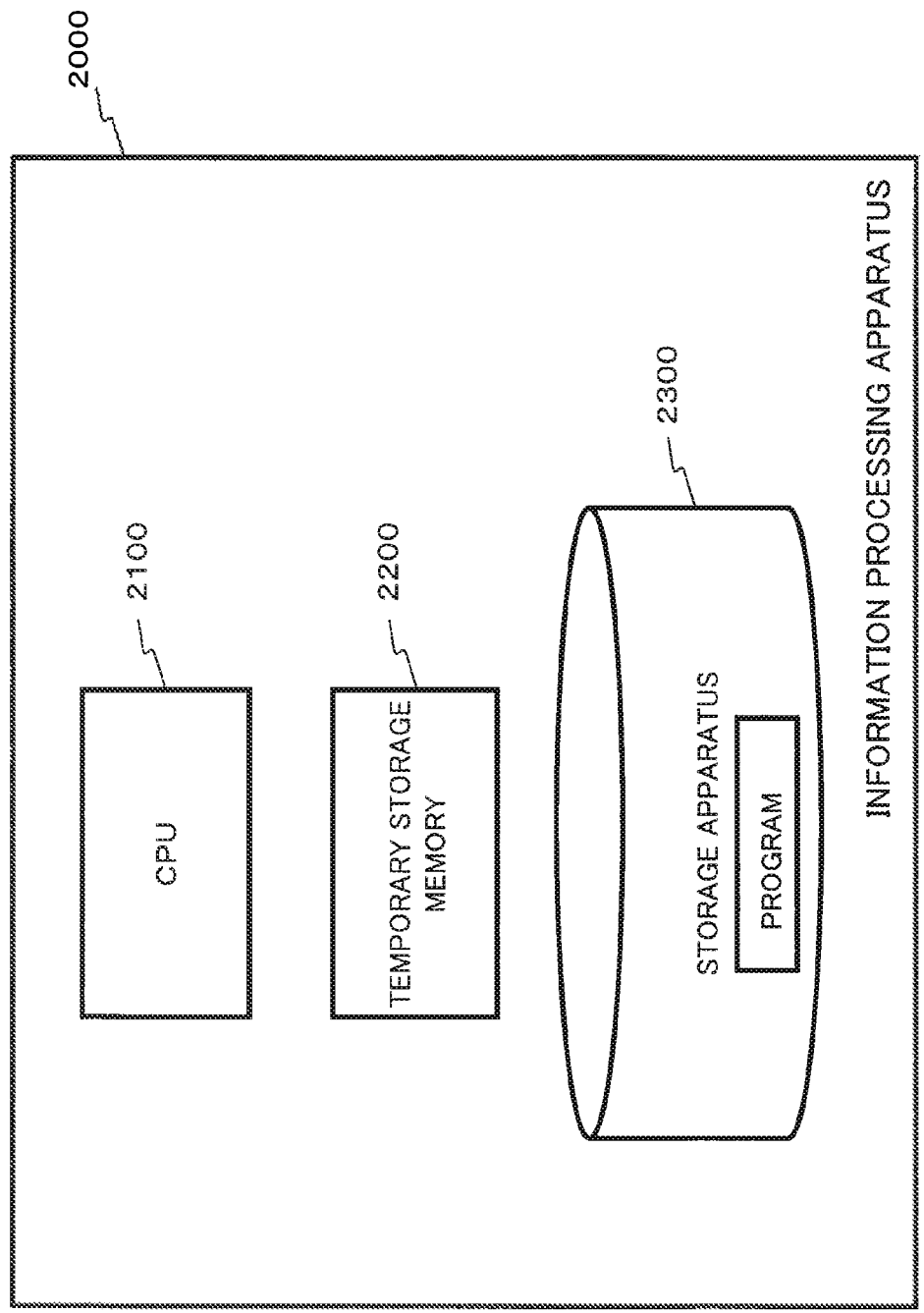
FIG. 11 is a block diagram exemplifying a configuration of an information processing apparatus that can realize the present invention by utilizing a computer program.

The present invention described by exemplifying the aforementioned first and second exemplary embodiments may be realized by, supplying a program that can realize the functions described in the flowcharts (FIGS. 2, 6, 7, 8, and 9) referred to in the description of the relevant exemplary embodiments, or a program that can at least realize the central control apparatus 101 illustrated in the block diagrams in FIGS. 1 and 10, to the information processing apparatus 2000 illustrated in FIG. 11, and then, executing the program using the CPU 2100. Further, the program supplied to the information processing apparatus 2000 may be stored in a non-volatile storage apparatus 2300, such as a readable and writable temporary storage memory 2200 and a hard disk drive.

The aforementioned exemplary embodiments may also be described in whole or part as the following Supplemental Notes but are not limited thereto.

(Supplemental Note 1) A supply and demand adjustment system including a central control apparatus and one or more supply-and-demand adjustment apparatuses, the central control apparatus including:

a supply-and-demand-adjustment-apparatus-state-collection unit that collects information relating to a state of each supply-and-demand adjustment apparatus;

an allocation band calculation unit that calculates a frequency band and an intensity of a fluctuation of supply and demand adjustment to be allocated to the supply-and-demand adjustment apparatus based on a state of the supply-and-demand adjustment apparatus; and a supply-and-demand-adjustment-amount-calculation unit that calculates a supply-and-demand adjustment amount for each supply-and-demand adjustment apparatus based on a frequency band and an intensity of a fluctuation of supply and demand adjustment to be allocated to the supply-and-demand adjustment apparatus.

(Supplemental Note 2) The supply and demand adjustment system according to Supplemental Note 1, wherein information relating to a state of the supply-and-demand adjustment apparatus includes at least one of a capacity and a delay amount of the supply-and-demand adjustment apparatus.

(Supplemental Note 3) A supply and demand adjustment system including a central control apparatus and one or more supply-and-demand adjustment apparatuses, the central control apparatus including:

a supply-and-demand-adjustment-apparatus-state-collection unit that collects information relating to a state of each supply-and-demand adjustment apparatus;

an allocation band calculation unit that calculates a frequency band and an intensity of a fluctuation of supply and demand adjustment to be allocated to the supply-and-demand adjustment apparatus based on a state of the supply-and-demand adjustment apparatus; and an allocation band transmission unit that transmits a frequency band and an intensity of a fluctuation of supply and demand adjustment to be allocated to the supply-and-demand adjustment apparatus to each supply-and-demand adjustment apparatus, wherein each of the supply-and-demand adjustment apparatuses includes a supply-and-demand-adjustment-amount-calculation unit that calculates a supply-and-demand adjustment amount of the supply-and-demand adjustment apparatus based on a frequency band and an intensity of a fluctuation of supply and demand adjustment to be allocated to the supply-and-demand adjustment apparatus, and the central control apparatus transmits a frequency band and an intensity of a fluctuation of supply and demand adjustment to be allocated to the supply-and-demand adjustment apparatus with lower frequency than frequency of performing supply and demand adjustment based on a supply-and-demand adjustment amount calculated by the supply-and-demand adjustment apparatus.

(Supplemental Note 4) The supply and demand adjustment system according to any one of Supplemental Notes 1 to 3, wherein the supply-and-demand adjustment apparatus is a power storage apparatus.

(Supplemental Note 5) A supply and demand adjustment method, in which a central control apparatus adjusts supply and demand of one or more supply-and-demand adjustment apparatuses, including:

collecting, by the central control apparatus, information relating to a state of each supply-and-demand adjustment apparatus;

calculating and allocating, by the central control apparatus, a frequency band and an intensity of a fluctuation of supply and demand adjustment to be allocated to the supply-and-demand adjustment apparatus based on a state of the supply-and-demand adjustment apparatus; and calculating, by the central control apparatus, a supply-and-demand adjustment amount for each supply-and-demand adjustment apparatus based on a frequency band and an intensity of a fluctuation of supply and demand adjustment to be allocated to the supply-and-demand adjustment apparatus.

The invention of the present application has been described with reference to the aforementioned exemplary embodiments, without limitation thereto. A variety of modifications that will be understood by those skilled in the art can be made to the configuration and details of the invention of the present application within the scope thereof.

This application claims priority based on Japanese Patent Application No. 2013-040698 filed on Mar. 1, 2013, which application is incorporated herein in its entirety by disclosure.

The invention claimed is:

1. A control device communicatively connected with one or more supply-and-demand adjustment apparatuses connected to a power system, the control device comprising:
 a state collection unit that collects information with regard to a state of each supply-and-demand adjustment apparatus;
 an allocation band calculation unit that calculates an allocation band that represents a frequency band and an intensity of a fluctuation of a supply-and-demand adjustment to be allocated to each supply-and-demand adjustment apparatus based on the state of said each supply-and-demand adjustment apparatus; and
 an adjustment amount calculation unit that calculates a supply-and-demand adjustment amount for each supply-and-demand adjustment apparatus based on the allocation band to be allocated to said each supply-and-demand adjustment apparatus.

2. The control device according to claim 1, wherein the information with regard to the state of each supply-and-demand adjustment apparatus includes at least one of a capacity and a delay amount of said each supply-and-demand adjustment apparatus.

3. The control device according to claim 1, wherein the control device further comprises:
 an allocation band transmission unit that is configured to transmit, to each supply-and-demand adjustment apparatus, the frequency band and the intensity of the fluctuation of the supply-and-demand adjustment to be allocated to said each supply-and-demand adjustment apparatus, wherein
 the control device transmits the frequency band and the intensity of the fluctuation of the supply-and-demand adjustment to be allocated to each supply-and-demand adjustment apparatus with a frequency lower than a frequency of performing a supply-and-demand adjustment.

4. The control device according to claim 1, wherein each supply-and-demand adjustment apparatus is a power storage apparatus.

5. A supply-and-demand adjustment apparatus connected to a power system, the supply-and-demand adjustment apparatus comprising:
 a supply-and-demand adjustment apparatus state transmission unit that transmits a supply-and-demand adjustment apparatus state;
 a supply-and-demand adjustment amount receiving unit that receives a supply-and-demand adjustment amount allocated based on the supply-and-demand adjustment apparatus state and an intensity of a fluctuation of a supply-and-demand adjustment; and
 a supply-and-demand adjustment unit that controls a supply-and-demand adjustment based on the supply-and-demand adjustment amount received.

6. The supply-and-demand adjustment apparatus according to claim 5, wherein the supply-and-demand adjustment apparatus state includes at least one of a capacity and a delay amount of the supply-and-demand adjustment apparatus.

7. The supply-and-demand adjustment apparatus according to claim 5, wherein the supply-and-demand adjustment apparatus is a power storage apparatus.

8. A supply-and-demand adjustment apparatus connected to a power system, the supply-and-demand adjustment apparatus comprising:
 a supply-and-demand adjustment apparatus state transmission unit that transmits a supply-and-demand adjustment apparatus state;
 an allocation band receiving unit that receives an allocation band allocated based on the supply-and-demand adjustment apparatus state;
 a supply-and-demand adjustment requirement recognition unit that acquires a supply-and-demand adjustment amount at intervals shorter than an interval to receive the allocation band; and
 a supply-and-demand adjustment unit that controls a supply-and-demand adjustment based on the acquired supply-and-demand adjustment amount and the received allocation band.

9. The supply-and-demand adjustment apparatus according to claim 8, wherein the supply-and-demand adjustment apparatus is a power storage apparatus.

10. A control device communicatively connected with one or more supply-and-demand adjustment apparatuses connected to a power system, the control device comprising:
 a state collection unit that collects information with regard to a state of each supply-and-demand adjustment apparatus; and
 an allocation band transmission unit that is configured to transmit, to each supply-and-demand adjustment apparatus, an allocation band with an interval longer than an interval of controlling an operation of a supply-and-demand adjustment by said each supply-and-demand-adjustment apparatus.

11. The control device according to claim 10, wherein each supply-and-demand adjustment apparatus is a power storage apparatus.

12. A supply-and-demand adjustment method, in which a control device is communicatively connected with one or more supply-and-demand adjustment apparatuses connected to a power system, the method comprising:
 collecting, at a state collection unit, information with regard to a state of each supply-and-demand adjustment apparatus;
 calculating, at an allocation band calculation unit, an allocation band that represents a frequency band and an intensity of a fluctuation of a supply-and-demand adjustment to be allocated to each supply-and-demand adjustment apparatus based on the state of said each supply-and-demand adjustment apparatus; and
 calculating, at an adjustment amount calculation unit, a supply-and-demand adjustment amount for each supply-and-demand adjustment apparatus based on the allocation band to be allocated to said each supply-and-demand adjustment apparatus.

13. The supply-and-demand adjustment method according to claim 12, wherein each supply-and-demand adjustment apparatus is a power storage apparatus.

14. The supply-and-demand adjustment method according to claim 12, further comprising:
 transmitting, to each supply-and-demand adjustment apparatus, the frequency band and the intensity of the fluctuation of the supply-and-demand adjustment to be allocated to said each supply-and-demand adjustment apparatus, with a frequency lower than a frequency of performing the supply-and-demand adjustment.

15. A non-transitory computer-readable program recording medium storing a computer program that causes a computer to execute the supply-and-demand adjustment method according to claim 12.

16. The supply-and-demand adjustment method according to claim 12, wherein the information with regard to the state of each supply-and-demand adjustment apparatus includes at least one of a capacity and a delay amount of the supply-and-demand adjustment apparatus.

17. A supply-and-demand adjustment method, in which a supply-and-demand adjustment apparatus is connected to a power system, the supply-and-demand adjustment method comprising:

transmitting, via a supply-and-demand adjustment apparatus state transmission unit, a supply-and-demand adjustment apparatus state;

receiving, at a supply-and-demand adjustment amount receiving unit, a supply-and-demand adjustment amount allocated based on the supply-and-demand adjustment apparatus state and an intensity of a fluctuation of a supply-and-demand adjustment; and controlling the supply-and-demand adjustment based on the supply-and-demand adjustment amount received.

18. The supply-and-demand adjustment method according to claim 17, wherein the supply-and-demand adjustment apparatus is a power storage apparatus.

19. A non-transitory computer-readable program recording medium storing a computer program that causes a computer to execute the supply-and-demand adjustment method according to claim 17.

20. The supply-and-demand adjustment method according to claim 17, wherein the supply-and-demand adjustment apparatus state includes at least one of a capacity and a delay amount of the supply-and-demand adjustment apparatus.

\* \* \* \* \*